United States Patent Office 3,794,477
Patented Feb. 26, 1974

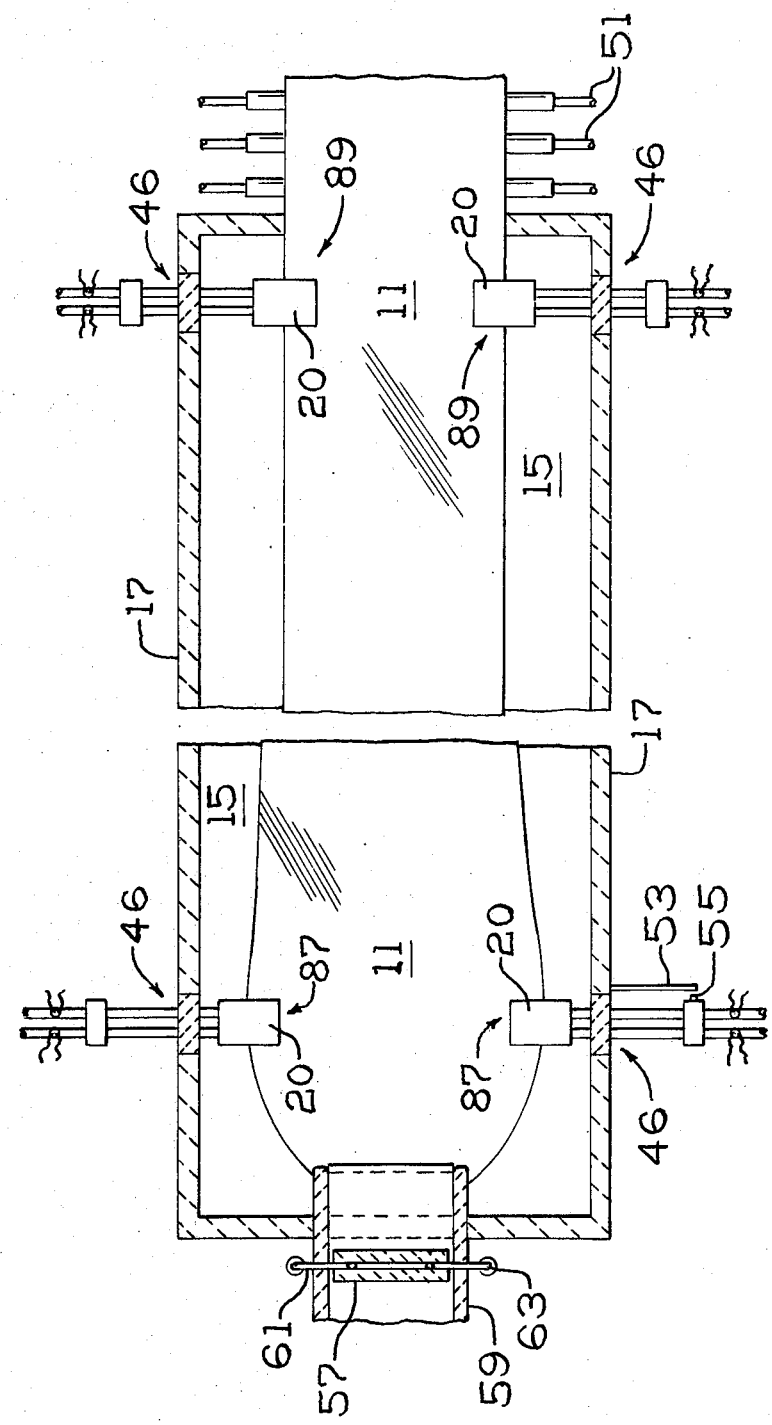

3,794,477
GLASS SHEET FLOAT APPARATUS WITH HEAT FLUX EDGE DETECTOR
Aloysius W. Farabaugh, Verona, and Joseph A. Gulotta, New Kensington, Pa., assignors to PPG Industries, Inc., Pittsburgh, Pa.
Filed June 9, 1972, Ser. No. 261,497
Int. Cl. C03b 18/02
U.S. Cl. 65—158
18 Claims

ABSTRACT OF THE DISCLOSURE

An apparatus for detecting the position of the edge of a body of hot glass floating on a pool of molten metal combines an elongated heat flux detector in a cooled enclosure and provides an output signal that is proportional to the amount of hot glass facing the detector. The device imposes no external forces upon the glass, does not contact the glass and may be held in a fixed position while providing a continuous signal despite glass movement.

CROSS REFERENCE TO RELATED APPLICATION

This application is related to copending, commonly assigned application, Ser. No. 261,493, filed on even date herewith by Joseph M. Matesa and Aloysium W. Farabaugh and entitled "Manufacture of Float Glass Having Controlled Width." This related application is incorporated herein by reference.

BACKGROUND OF THE INVENTION

This invention relates to the manufacture of flat glass and to a device for detecting the location of an edge of the glass during its formation while hot.

In particular the present invention is related to an improved device and method for determining the width and position of a ribbon of hot float glass while yet being formed in a hot float bath chamber.

Workers skilled in the art of float glass manufacture have considered it a desirable objective to determine the position of a ribbon of glass and the width of a ribbon of glass within a float bath chamber has severely limited advancements in detecting ribbon location and ribbon width within a float bath and has deterred control of ultimate ribbon width, thickness and optical quality responsive to measured conditions within the float bath while the glass is being formed. Exemplary of past attempts to detect the edge of a ribbon of glass during forming are U.S. Pats. No. 3,482,954 and No. 3,500,548. These prior art devices, while quite suited for detecting a glass ribbon edge well downstream in the process where the environment is less hostile than in the region where the glass is yet acting as a viscous liquid, are subject to certain problems if employed throughout the float bath chamber. The device of U.S. Pat. No. 3,500,548 does not provide for a continuous measurement of ribbon edge, but rather relies on detecting a glass ribbon edge in discrete steps. The device may be used within the float bath, but is subject to substantial wear and likelihood of damage due to the fact that it operates only upon contact with the glass. The device of U.S. Pat. No. 3,482,954 operates on a pneumatic principle and requires a complex servomechanism for tracking the edge of the glass ribbon. By its use of gas flows it cools and applies a downward point force upon the edge of a glass ribbon at the point of sensing the ribbon, which cooling and presure can disturb the ribbon and affect its local thickness. It is a device which, though producing a continuous edge signal, requires mechanical tracking of the ribbon though use of an elaborate servomechanism.

A recent French patent, No. 2,060,235, has disclosed a method for detecting the edge of a ribbon of glass in a float bath by a technique which provides continuous coverage of the glass edge position and does not apply any external force upon the ribbon. The device does require tracking of the ribbon edge and employs a pyroelectric technique and a limited band width filter to detect the radiation from the hot glass.

SUMMARY OF THE INVENTION

An apparatus is provided for detecting the position of a side edge of a ribbon or body of hot glass advancing on a bath of molten metal. The edge detector of this invention provides for continuous detection of a ribbon edge over an extended distance without requiring any movement or tracking to follow the ribbon edge. The device of this invention provides for the detection of a glass ribbon edge without imposing an external force upon the glass either by contact or by directing a fluid or other material at substantial pressure against the glass.

An apparatus is provided to detect the boundary between two regions or bodies of differing emissivity. The apparatus comprises elongated heat flux detecting means and elongated cooling means associated therewith. Heat flux detecting means comprise means for detecting temperature differences across thermal insulating means, for example hot and cold junctions of a thermocouple mounted on opposite sides of a thermal insulator. Individual thermocouple junctions may be bead junctions, strip junctions or the like. Elongated heat flux detecting means comprise a plurality of means for detecting temperature difference connected in combination to detect the representative or average temperature difference across a thermal insulator along its length. The detecting means is elongated in the sense that the combination defines a length over which a representative temperature difference is detected which is substantially greater than the center-to-center spacing of adjacent temperature difference or thermal flux detectors. In the present invention the ratio of the overall length to the individual thermal flux detector spacing is at least 10, preferably 50 and more preferably 100, particularly when no refined means is provided for focusing, columating or directing heat toward the apparatus.

The elongated cooling means is associated with the elongated thermal flux detecting means to cool the colder side of the thermal insulating means which is a part of the thermal flux detecting means. In operation the cooling provided by the elongated cooling means is sufficient to balance the heat supplied to the hot side of the detecting means by radiation from hot bodies which are in view. Thus, by heat balance it is evident that the temperature difference detected is proportional to the heat received by radiation, which in turn is proportional to the amount of the elongated detecting means which faces and views the body having greater emissivity.

The elongated heat flux detector is positioned over both bodies during operation such that a projection of the detector onto a plane containing the boundary intersects the boundary between the bodies. The body having higher emissivity, such as glass, radiates more heat to the detector than the other body so that the portion of the detector facing the more emissive body becomes hotter on its hot face which causes a higher heat flux and higher temperature difference over that portion. Thus, the average temperature difference over the entire length increases as an increasing portion of the detector faces the more emissive body.

In the selection of materials it is important that the thermal insulating material have a thermal conductivity which remains substantially unchanged over the expected temperature range of operation. Also, it is important that the thermocouple or other temperature detecting means employed be uniformly responsive over the expected temperature range. That is voltage, current or other signal response should preferably be linear with respect to temperature difference over the range. In this way the signals derived will be directly proportional to heat flux even if the overall absolute temperature varies.

The edge detection apparatus of this invention comprises an enclosure which is suspended over the body of hot or molten glass and over the adjacent supporting molten metal. The enclosure is provided with an elongated window on the side facing the molten metal and the hot body of glass. The window may be an open elongated slot or may comprise a series of small openings (such as circular, rectangular or elliptical) a series of short solts or the like, in an elongated pattern arrangement. An elongated window may be provided with a selectively transmitting filter which will transmit energy in a selected wavelength band, such as infrared radiation.

Within the enclosure of the present apparatus is disposed an elongated thermal or heat flux detecting device aligned with the window so as to "see" the hot body of glass and the molten metal facing the elongated window. The heat flux detecting device will typically comprise an elongated thermal insulating element having, disposed on one surface facing the hot body of glass and the molten metal, a temperature sensing means, and, on its opposite side, a second temperature sensing means. The difference in temperature between the two sides of the thermal insulating means provides an indication of the rate of heat transfer through the insulator, which corresponds to the heat flux or rate of heat transfer from the body of hot glass and molten metal to the facing surface of the insulator. Increased heat flux which is detected indicates an increased portion of the detector is receiving heat from the hot glass which, in turn, indicates glass extending farther into the detectors field of view.

The heat flux detector generates a signal (voltage, current, etc.) which is responsive to the imposed temperature difference. The detector is connected to a conventional indicator, recorder, computer or the like to convert the generated signal into a readable representation of glass edge position and to display such a representation.

A suitable heat flux detecting device comprises a thin thermal insulator and a series of thermocouples with alternate thermocouple junctions in the series being positioned on opposite surfaces of the thermal insulator. The output signal of such a series of thermocouples is representative of the average temperature difference from one surface of the thermal insulator to the other. A preferred device for detecting thermal or heat flux comprises copper-constantin thermocouples in closely spaced relation. Other thermocouple combinations may also effectively be employed. Typical thermocouple combinations which may be employed are Chromel-Alumel, iron-constantin, and the like. Thermocouples should be selected to have a voltage response which is substantially linear with respect to temperature within the temperature range anticipated within the detector enclosure.

The surface of the thermal insulator facing the hot body of glass and the molten metal is preferably made particularly receptive to radiation from the glass and the molten metal. It is preferred that the thermocouples which cover the hot glass-facing surface of the insulator be covered with a material having a high emissivity in order that the absorption of heat will be enhanced. Black coverings, such as carbon materials, are effectively employed for this purpose. A surface emissivity exceeding 0.7 and preferably exceeding 0.9 is preferred.

In order to detect a heat flux by detecting a temperature difference across an insulator, it is necessary to provide cooling for the heat flux detector. Cooling is further necessary to protect the device from thermal damage. Means are provided for cooling the heat flux detector in the present apparatus. Suitable means for accomplishing this objective may comprise a source of pressurized cooling gas, such as nitrogen, connected to the enclosure space surrounding the heat flux detector. The combination is preferably constructed so that cooling gas may be directed into the space surrounding the heat flux detector and directed out through the elongated viewing window so as to simultaneously cool the detector and purge the space and window of any condensed vapors from the float bath atmosphere. By purging continuously it is possible to maintain the window and detector in a suitable state of cleanliness for reliable operation. It is preferred that the cold junction thermocouples, that is those on the insulator surface facing away from the glass, be in close proximity to a high capacity heat sink, such as provided by a chamber continuously supplied with high heat capacity coolant at a suitably low temperature to continuously withdraw heat from the thermocouples and maintain them at a temperature sufficiently below the glass facing thermocouples to easily measure the temperature difference without significant error.

This further cooling is provided to the enclosure by providing a jacket around the enclosure through which a high heat capacity cooling fluid, such as water, is directed.

The apparatus of this invention may further be provided with glass temperature and molten metal temperature sensing means so that the effect of these variables may be accounted for when deriving a glass edge position from heat flux detection.

A shield may be provided in surrounding relationship about the detecting apparatus of this invention to shield the target area of molten metal and hot glass facing the detector from radiation of the surroundings, such as the bath chamber roof. Such shielding is important to minimize the reflection of such radiation from the molten metal and to thereby enhance the diverse quantities of radiation emanating from the molten metal and the hot glass and directed toward the detector. Such a radiation shield may comprise a cooled metal structure attached to the enclosure of the present apparatus, which is described above, or preferably the jacket itself may be sized to provide a shielding effect.

The apparatus of this invention may further be provided with means for detecting the position of its enclosure and heat flux detecting means with respect to the sidewalls of the float bath chamber. Two devices, such as already described, may be placed on opposite sides of a float bath and provided with means for detecting the distance between the devices in order to provide for continuous monitoring of the widths of a ribbon of glass during formation and attenuation. The means for detecting the distance between the apparatus may comprise mechanical means external or internal to the bath chamber itself or may comprise mutually responsive detectors on the devices within the bath chamber itself. A suitable arrangement for measuring or monitoring the glass ribbon width comprises two edge detecting devices mounted through the bath chamber sidewalls in opposing positions, with each device provided with means for measuring or establishing the distance separating the heat flux detector employed from the outside surfaces of the bath chamber walls, which are a known distance apart.

As described in the copending commonly-assigned application, filed on even date herewith, entitled "Manufacture of Float Glass Having Controlled Width," several pairs of edge detecting apparatus according to this invention may be employed in a control scheme to improve the control of glass ribbon thickness, width and optical quality.

The elongated detector of this invention will be positioned for operation such that a projection of the major dimension of the detector to a plane containing the boundary of interest intersects the boundary. In this way the detector faces both bodies, and the generated signal is proportional to the amount of the detector facing the more emissive body. Preferably the detector will be substantially perpendicular to the boundary; that is the angle between the two will be at least 60° and preferably close to 90°. Nevertheless, alignment at at least a 30° angle will permit operation if care is exercised in calibration.

BRIEF DESCRIPTION OF THE DRAWINGS

The present invention will be further understood with reference to the accompanying drawings, in which like reference numbers indicate like elements:

FIG. 4 is a schematic plan view of a float bath showing a plurality of edge detectors, such as shown in FIG. 1, arranged in combination to provide for the detection of the width and lateral position of a ribbon of float glass during its formation. The edge detecting device shown in the lower left of FIG. 4 shows means for detecting the position of the detector with respect to the float bath chamber structure and with respect to an opposing position edge detection device.

The details of the preferred embodiment of this invention may be readily understood from the description which follows, making reference to the attached drawings.

DESCRIPTION OF THE PREFERRED EMBODIMENT

Figure 1:
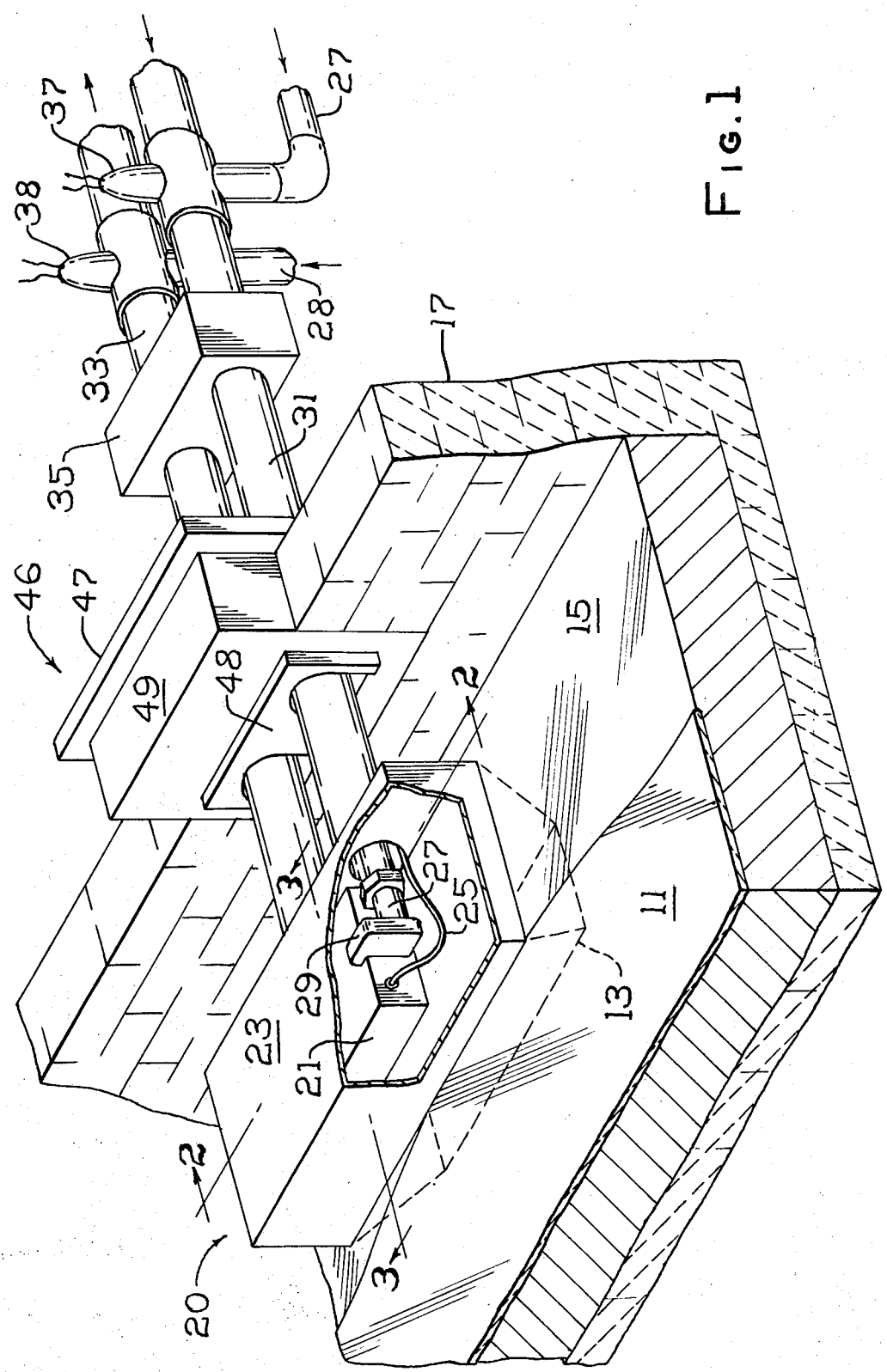
FIG. 1 is a schematic perspective view of the apparatus according to this invention showing the special relationship between the detector of this invention and a hot body of glass floating on molten metal in a float bath chamber.

Referring to FIG. 1, a section of the interior of a float bath chamber is shown, having refractory walls 17 and a pool or bath of molten metal, preferably tin, 15 in the bottom of the chamber. Floating on the molten tin 15 is a body of hot glass 11, which is undergoing attenuation and cooling into a final ribbon of flat glass.

An edge detection device 20, according to this invention, is positioned above the hot glass and molten tin in facing relation to target area 13. As will be described below, area 13 is a target area which is shielded from radiation of the surroundings, particularly radiation from the refractory roof of the float bath chamber. Substantially within target area 13 is a viewing area defined by the particular geometry and size of a viewing window of the device.

Figure 2:
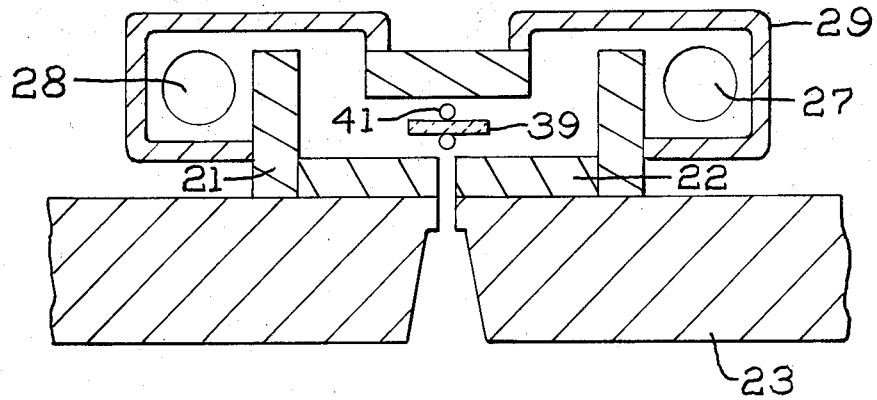
FIG. 2 is a cross-sectional view of the detector of this invention, taken along section line 2 of FIG. 1.

The edge detecting device 20 comprises an enclosure 21 surrounded by a radiation shielding enclosure 23. A space is provided between enclosure 21 and the surrounding jacket or shield enclosure 23. During operation a high heat capacity coolant, such as water, flows into and circulates through this space. Referring to FIG. 2, coolant flows about the structure shown attached to jacket, 23. A vertical baffle may be provided extending upwardly from the center of enclosure 21 to the upper inside surface of jacket 23 (not shown in FIG. 2). This baffle will improve coolant circulation by preventing bypass flow over enclosure 21.

The device is supported by coolant pipes 31 and 33, which are connected to the jacket or shield enclosure 23 on opposite sides of enclosure 21. The particular embodiment shown in FIG. 1 employs the coolant pipes for support. However, it will be understood that other supporting means might alternatively be employed. The supporting cooling pipes 31 and 33 pass through a side seal 46 mounted in the sidewall 17 of the float bath chamber.

The device is mounted in a float bath chamber through side seal 46, which comprises a refractory block 49 having a rectangular hole therethrough which will accommodate the passage of the jacket or shielding enclosure 23. A slotted plug 48 is provided to seal the rectangular hole when the device is inserted within the bath and is sized to wedge downwardly against pipes 31 and 33, rigidly holding the entire apparatus in position once installed. The side seal is further provided with back plate 47. When the device of this invention is removed from the float bath chamber, slotted plug 48 may be replaced with a blank or solid plug to seal the bath.

The supporting coolant pipes 31 and 33 are provided with a cross member 35 to prevent twisting of the combination due to thermal or mechanical effects, such as might be caused by flexible coolant and purge gas connections on the extremities of pipes 31 and 33.

The thickness or width of the side seal 46 will typically be about one foot, or the same thickness as the bath refractory wall 17, but may suitably be constructed having a greater thickness, such as up to two feet, to provide a broader base of support and thereby minimize vertical motion of the operative portion of the device over the glass-metal target area.

Generally, slotted plug 48 should have horizontal and vertical dimensions, respectively $3/16$ inch$\pm 1/16$ inch, smaller than the rectangular access hole through refractory insulator member 49. A tighter fit may result in substantial difficulty when attempting to remove a plug and apparatus, such as for maintenance, and a fit which is less tight will permit excessive movement of the detecting apparatus when installed.

Figure 3:
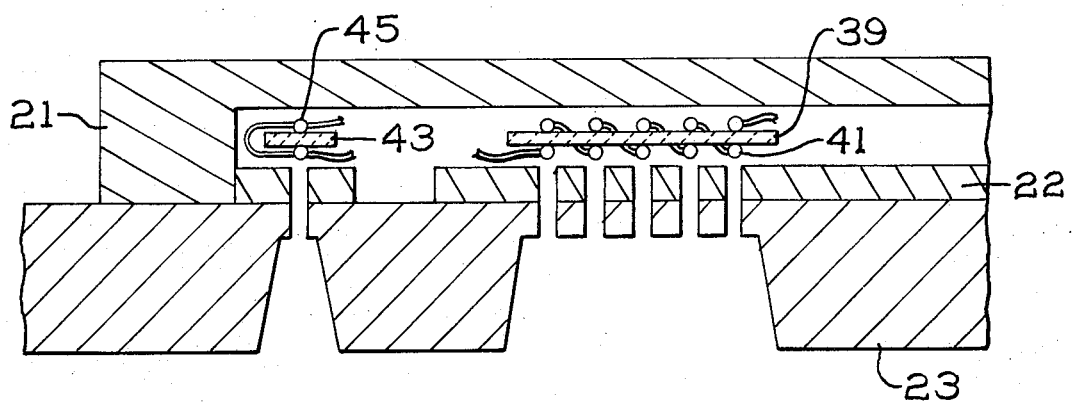
FIG. 3 is a cross-sectional view of the edge detector of this invention, taken along section line 3 of FIG. 1.

Referring now also to FIGS. 2 and 3, in addition to FIG. 1, the enclosure 21 is provided with bottom plate 22 having apertures for a window therethrough. A narrow band filter, such as an infrared filter, may be mounted between bottom plate 22 and the bottom of jacket or surrounding shield enclosure 23. However, such a filter is optional.

A heat flux detector is provided within enclosure 21. The principal elements of the heat flux detector are an elongated strip of thermal insulating material 39, about which is wrapped a plurality of thermocouples 41, which are connected in series with alternate thermocouples in the series being mounted alternatively on the upper or cold surface of insulator 39 and on the lower hot glass facing surface of insulator 39. The combination of thermocouples and thermal insulation are covered with electrical insulation. The heat flux detector is positioned within enclosure 21 so as to be aligned with and facing an elongated window in the bottom of enclosure 21 and jacket or shield enclosure 23, which elongated window faces the hot glass and molten metal and is aligned to be substantially perpendicular to a line defining the edge of the hot body of glass floating on the molten metal.

The thermocouple junctions mounted on the hot side of the heat flux detector, which is the side facing the hot glass and molten metal, are preferably covered with a material having a high emissivity. This high emissivity covering is provided to ensure that heat radiated through the window toward the heat flux detector will be substantially absorbed by the hot surface of the detector. A suitable material for coating the thermocouples and surface of the detector is a black material, such as carbon or graphite. Commercially available graphite, which may be applied by spray application, has been found suitable for this purpose.

The thermocouple junctions mounted on the cold side of the heat flux detector are electrically insulated from but thermally coupled with enclosure 21. Preferably the heat flux detector will be mounted in the enclosure 21 by being cemented to it by thermally conductive cement. With the thermocouple junctions on the upper surface of insulator 39 (as seen in FIGS. 2 and 3) thermally coupled with enclosure 21, these junctions act as cold reference junctions operating at about the same temperature as the inlet coolant so long as coolant flow is maintained at a sufficient rate to provide for only a small temperature rise from inlet to outlet.

The heat flux detecting means thermocouples 41 are preferably placed about .020 inch apart and comprise copper constant in wire of about .003 inch diameter. The overall length of the detector is preferably from about 10 to 18 inches. The thermocouple combination of the heat flux detector is preferably connected to a remote indicator or recorder through a stainless steel sheathed copper cable 25 with magnesium oxide insulation surrounding the copper lead wires. This connector cable 25 is directed through one of the water pipes 31 or 33 and through a packing gland pressure sea in the T or cross of pipe 31 to a remote connector 37. The remote connector 37 will generally be a three-pin connector connected to the wires of connecting cable 25.

As shown in FIG. 3 an additional thermocouple 45 with insulator 43 may be provided to detect the heat flux or temperature at a location which, during operation, is maintained over glass only. The detected heat flux or temperature from this detector may be used to calibrate and adjust the response from the elongated heated flux detector. Signal lead wires from thermocouple 45 are provided with sheathed cable directed through pipe 33 to a remote thermocouple connector 38. This optional thermocouple combination may be served by connecting wires which share the same sheathing 25 as provided for the connecting wires of the elongated heat flux detector. Also, separate grounding may be eliminated with the water pipe themselves grounded and electrically coupled with any thermocouple wire shielding.

The elongated window through which the heat flux detector "sees" the hot glass and molten metal may comprise a single elongated slot, a plurality of apertures along a line or a plurality of short slots or the like. The preferred window is a series of cylindrical apertures as shown in FIGS. 2 and 3. The effect of a series of apertures in line is for each to individually restrict the field of view of thermocouples in the immediate vicinity of each aperture. This effectively focuses the boundary between molten metal and hot glass on the heat flux detector in much the same way a pin hole camera focuses an image. Thus, the series of small apertures provides for greater resolution than does an elongated single slot.

A gas purge, which provides cooling and purging about the heat flux detector is provided. Purge gas lines 27 and 28 are directed axially through coolant lines 31 and 33, respectively, and enter the jacket or surrounding shield 23. There, for example, purge gas line 27 is connected to enclosure 21 by purge line connecting duct 29. Preferably, purge gas connecting duct 29 will be so constructed as to direct a purge gas into the chamber downwardly and across the heat flux detector. Grooves and baffles are preferably provided within enclosure 21 in order to ensure the uniform distribution of purged gas across the length of the elongated heat flux detector. In the preferred embodiment, purge gas flows through enclosure 21 and is discharged therefrom through the apertures comprising the elongated window through the hot glass facing side of enclosure 21 and jacket 23.

In the preferred embodiment, purge gas tubes 27 and 28 comprise ⅜ inch tubing. The purge gas tubes enter the coolant tubes through pressure packing gland pressure seals mounted in T's or crosses, as shown in FIG. 1, or are directed through seals mounted in the ends of pipes 31 and 33 while coolant is supplied to the pipes through side connectors. The purge gas is provided to the opposing purge gas tubes 27 and 28 from a common source, and may be split into two streams immediately prior to entry into the axially disposed tubes 27 and 28. When splitting the purge gas flow immediately before directing it to the apparatus, it is preferred that each inlet connection be made on the run of a T and the source of pressurized purge gas be connected to the base of the T. It has been found that a balanced flow of purge gas is provided by employment of such a connection. During operation, the preferred purge gas will be nitrogen, although other inert gases may be effectively employed.

Means may be provided for detecting or indicating the position of the glass edge detector 20 with respect to the float bath chamber. A simple device for indicating the position of the detector 20 with reference to the float bath chamber is illustrated in FIG. 4. An indicator rod 53 is mounted on side seal 46 substantially parallel to the coolant pipes 31 and 33. The rod is provided with index marks. A pointer 55 is attached to the water pipe combination. Such a simple device may be observed manually to determine the position of the detector 20 relative to the float bath chamber.

FIG. 4 illustrates a combination of glass edge detecting devices arranged in opposing pairs to detect the width of the floating glass at different positions along its path of travel through the forming bath. The width of the ribbon may be determined from the detected edge positions from two opposing edge detectors combined with the detection of the relative spacing between the two detectors, which in turn may be determined from the relative position of each detector with respect to the float bath chamber of known width. The employment of a plurality of edge detection devices to provide signals for the control of glass ribbon width is the subject of the cross-referenced copending commonly-assigned application, entitled "Manufacture of Float Glass Having Controlled Width," of Joseph M. Matesa and Aloysius W. Farabaugh, filed on even date herewith and incorporated herein by reference. In FIG. 4, which is a plan view, are shown also the following elements: the attenuating drive rolls 51 apply longitudinal force to the glass as it is cooled passing through the float bath; the molten glass which is fed to the bath is discharged from a melting and refining tank (not shown) through a canal 56 comprising a bottom and sidewalls 59. The quantity of molten glass flowing into the float bath chamber is controlled by a sluice gate or tweel 57, which is a refractory member which may be raised or lowered to vary the cross-sectional opening through the canal. The tweel 57 is supported by a cross member 61, which in turn is supported by a pair of vertical upright tweel drive shafts 63, which are driven up and down by a screw jack or hydraulic mechanism (not shown).

The following procedure is recommended for preparing the indicator for operation. A blank plug positioned in side seal 46 is removed. A water inlet hose is connected to water pipe 31 and a water drain hose is connected to water pipe 33. Coolant water is turned on to provide full flow through pipes 31 and 33 and through the jacket 23 of the device. Water temperature will preferably be maintained below 100° F. and, in any event, a water temperature above 130° F. should be avoided. A nitrogen hose is connected to purge gas pipes 27 and 28 and purge flow is established at between 50 and 100 standard cubic feet per hour, and preferably at about 60 to 80 standard cubic feet per hour. Shielded electrical cable is connected to outlet plugs 37 and 38. This electrical cable is connected to recorder controllers or like devices to provide a readable indication of signals representative of glass edge position. When the described connections have been made, a final inspection should be made to ensure that the device is water tight.

The jacket and detector end of the device is inserted through the hole in block 49 of side seal 46 and instrument plug 43 is placed over pipes 31 and 33 and is caused to slide into the space through block 49. The device should be slowly advanced into the float bath chamber at a rate of about 18 inches every five minutes, or slower, in order to minimize any sudden cooling of the glass ribbon edge. After insertion of the device to the vicinity of the glass ribbon edge, the device is ready for calibration.

The following procedure should be followed to calibrate the edge detection device of this invention. First, move the instrument completely over the glass so that viewing area 13 is completely over hot glass. Then, observe and note the output signal from the heat flux detector and an independent glass viewing thermocouple is provided from it as well. Both readings should be approximately the same. Next, move the instrument to a position where the entire target area 13 is over molten metal, and again observe and note the output signals. Move the instrument toward the center of the bath until an output signal for the heat flux detector is observed which is midway between that observed when the instrument is completely over glass and that observed when the instrument is completely over molten metal. Note the indicated position of the instrument with respect to the float bath chamber in employing the scale and pointer mounted on the side seal and water pipes, respectively.

The simple calibration technique described eliminates error which might be introduced during an incremental stepwise calibration over the range of the instrument due to movement of the glass during the calibration procedure. The heat flux detecting device of this apparatus is not perfectly linear in response. That is, a graphical representation of glass position with respect to voltage or output signal strength would appear as a slightly S-shaped response. The described calibration procedure utilizing the entire span of the instrument incorporates this slight non-linearity in the response of the instrument, but for instruments which are relatively long relative to the anticipated movement of glass edge, this is an acceptable situation.

During operation, the described devices are found to be rapidly responsive to changes in ribbon conditions. For example, in the region of the float bath, near the upstream end where the ribbon is at about its maximum width when making equilibrium thickness glass and the molten glass is behaving as a viscous liquid, the response time of the instrument is about 5 seconds. That is, the output signal of a device will be at 63 percent of its final value within 5 seconds if a change has been made which is equivalent to a step change. Thus, a reading made within 15 seconds of a step change would be substantially equivalent to a final reading, with the reading being over 93 percent final. Since, in fact, step changes are most unlikely in a continuous process such as the making of glass by the float process, a reading taken over a much shorter period of time will lag the actual condition by less than one time constant for a step change.

Due to the thorough purging effect of the purge gas, the devices of this invention may be maintained in a float bath atmosphere for extended periods of time without requiring cleaning, although calibration at least weekly is recommended. It is expected that the devices of this invention may remain in a float bath for from four to six months without requiring removal or any substantial manual cleaning.

The apparatus of this invention takes advantage of the fact that molten metal and hot glass have vastly different emissivities. Thus, with the glass and the adjacent molten metal at approximately equivalent temperatures, the glass will emit a much greater quantity of infrared radiation. By placing a heat flux detector in closely spaced relation facing the molten metal hot glass boundary, it is possible to correlate the amount of heat flux detected as a direct function of the amount of glass areas viewed by the heat flux detector. In order to measure the heat flux, it is most convenient to measure a heat flux across a thermal insulator by measuring the temperature difference across such an insulator and to continuously cool the side of the insulator away from the radiant heat source. This is provided by the heat flux detector and associated cooling means device.

Molten metal, being quite reflective, can direct heat toward a heat flux detector which is reflected from the molten metal rather than emitted from the molten metal. Since the refractory roof and refractory sidewalls of a float bath chamber are highly emissive, they cause substantial infrared radiation to be directed to the molten metal surface from which it reflects. To ensure that in the viewing of the heat flux detector of the present apparatus no substantial anomalous reflected radiation is encountered, the device is preferably provided with a sufficiently large cooled radiation shield comprising a surrounding jacket, so that the viewing area of the heat flux detector is substantially within the dark shadow "or umbra" of the radiation shielding jacket.

The field of view of the preferred embodiment is defined by a viewing angle of about 40°, or 20° on either side of the center line of the longated window. By the principles of geometry, a proper combination of radiation shield width and instrument to molten metal surface distance may be defined. For example, in the preferred embodiment, the radiation shielding jacket is about 6 inches wide and is preferably mounted within about 3 inches of the glass and molten metal surface.

As will be evident to those skilled in the art, variations and deviations may be made from the preferred embodiments described without departing from the spirit of the present invention, which takes advantage of the different emissivities of two bodies, such as molten metal and hot glass, to detect the position of a boundary therebetween. Accordingly, the specific description contained above is intended to be exemplary and not limiting, and all embodiments and variations of the present invention encompassed by the following claims are considered to fall within the purview of applicants' discovery.

What is claimed is:

1. An apparatus for detecting the location of a boundary between two bodies of differing emissivity comprising
    (a) elongated heat flux detecting means having means for receiving heat from both of said bodies over a substantial portion of said elongated heat flux detecting means length when said heat flux detecting means is oriented such that its projection onto a plane containing the boundary intersects said boundary; and
    (b) cooling means associated with said elongated heat flux detecting means to remove heat therefrom in correspondence to heat received by said elongated heat flux detecting means from said bodies, said cooling means comprising sufficient cooling capacity to remove substantially all heat received by said detecting means along its length.

2. The apparatus according to claim 1 wherein said elongated heat flux detecting means comprises
    (a) an elongated thermal insulator, having one elongated major surface facing toward said bodies and one elongated major surface facing away from said bodies and substantially thermally coupled with said cooling means; and
    (b) a plurality of temperature difference detecting means disposed in spaced relation along the length of said elongated thermal insulator such that each comprises means for detecting the temperature difference from said body facing surface to said cooling means coupled surface of said elongated thermal insulator at the location of said temperature difference detecting means.

3. The apparatus according to claim 2 wherein the length of said elongated heat flux detecting means is at least 50 times the spacing between adjacent means for detecting temperature difference and said means for detecting temperature difference are substantially uniformly spaced over substantially the entire length of said elongated heat flux detecting means.

4. The apparatus according to claim 2 wherein the length of said elongated heat flux detecting means is at least 100 times the spacing between adjacent means for detecting temperature difference and said means for detecting temperature difference are substantially uniformly spaced over substantially the entire length of said elongated heat flux detecting means.

5. The apparatus according to claim 4 wherein
    (a) said means for detecting temperature difference comprise thermocouples each having one junction positioned on one major surface of said elongated thermal insulator and the other junction positioned on the other major surface of said elongated thermal insulator; and (b) said thermocouples are serially connected to provide means for detecting the overall representative temperature difference between the major surfaces of said elongated thermal insulator along its length.

6. The apparatus according to claim 5 wherein the surface of said heat flux detector for facing said bodies has an emissivity of at least about 0.7.

7. An aparatus for detecting an edge of a body of hot glass disposed adjacent a body of molten metal comprising (a) an enclosure disposed in spaced facing relation to said body of hot glass and said body of molten metal with said enclosure extending over an area including an edge of said body of hot glass;

(b) an elongated window in said enclosure facing said body of hot glass and said body of molten metal with the orientation of the major dimension of said elongated window substantially perpendicular to a line corresponding to the edge of said body of hot glass faced by said window;

(c) an elongated heat flux detecting means positioned within said enclosure and aligned with said elongated window facing said body of hot glass through said window so that a portion of said heat flux detecting means faces said body of hot glass and a portion of said heat flux detecting means faces said hot metal; and (d) means for cooling said elongated heat flux detecting means within said enclosure.

8. The apparatus for detecting an edge of a body of hot glass according to claim 7 wherein said heat flux detecting means comprises, in combination, (a) elongated thermal insulating means;

(b) a plurality of theromcouples connected in series with alternate thermocouple junctions disposed on opposite sides of said thermal insulating means, and said combination is positioned within said enclosure such that the thermocouple junctions on one side of said thermal insulating means face said body of hot glass and the thermocouple junctions on the opposite side of said thermal insulating means face away from said body of hot glass.

9. The apparatus for detecting an edge of a body of hot glass according to claim 8 wherein said thermocouples are copper-constantin thermocouples.

10. The apparatus for detecting an edge of a body of hot glass according to claim 8 wherein said elongated window comprises a series of apertures disposed along a line, and said means for cooling comprises a source of high heat capacity coolant connected to coolant chamber means thermally coupled with said thermal insulating means surface facing away from said body of hot glass.

11. The apparatus for detecting an edge of a body of hot glass according to claim 7 further comprising means for purging said heat flux detector enclosure wherein said window is an open window and said purging means comprises a source of pressurized gas connected to said enclosure, said gas having sufficient pressure to force gas into said enclosure and outwardly through said open window.

12. The apparatus for detecting an edge of a body of hot glass according to claim 7 wherein said apparatus further comprises at least one thermocouple adapted for detecting the temperature of said body of hot glass.

13. The apparatus for detecting an edge of a body of hot glass according to claim 7 wherein said apparatus comprises cooling means in substantially surrounding relationship to said heat flux detecting means.

14. The apparatus for detecting an edge of a body of hot glass according to claim 7 wherein said apparatus is provided with means for detecting the position of said enclosure containing said heat flux detecting means with respect to sidewalls of a structure containing said body of hot glass and said body of molten metal.

15. The apparatus for detecting an edge of a body of hot glass according to claim 7 wherein said elongated window is provided with selectively transmitting filter means for transmitting substantially all incident infrared radiation while reflecting substantially all incident ultraviolet and visible radiation.

16. The apparatus for detecting an edge of a body of hot glass according to claim 7 wherein said apparatus further comprises radiation shielding means surrounding said elongated window to substantially reduce the incidence of radiation from surroundings upon said body of hot glass and upon said body of molten metal.

17. Apparatus for detecting the width of a ribbon of hot glass floating on a bath of molten metal comprising at least one pair of apparatus according to claim 7 positioned in opposing relation on opposite sides of said ribbon of glass and provided with means for detecting the distance between said apparatus.

18. Apparatus for controlling the width of a ribbon of glass during its formation in a float bath chamber comprising width detecting apparatus according to claim 17 connected to means for controlling the discharge of molten glass into said float bath chamber.

References Cited
UNITED STATES PATENTS 2,392,873   1/1946   Zahl _____ 250—83.3 H
2,994,772   8/1961   Green _____ 250—833 H ARTHUR D. KELLOGG, Primary Examiner U.S. Cl. X.R.

65—99 A, 182 R; 250—83.8 H